United States Patent
Roeger et al.

(10) Patent No.: US 10,958,760 B2
(45) Date of Patent: Mar. 23, 2021

(54) DATA PROCESSING SYSTEM USING PRE-EMPTIVE DOWNLOADING

(71) Applicant: INTERNATIONAL BUSINESS MACHINES CORPORATION, Armonk, NY (US)

(72) Inventors: Brad Roeger, Hampshire (GB); Esther Roeger, Winchester (GB); William Yates, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

(21) Appl. No.: 15/822,307

(22) Filed: Nov. 27, 2017

(65) Prior Publication Data
US 2019/0166226 A1    May 30, 2019

(51) Int. Cl.
| | | |
|---|---|---|
| G06F 12/00 | (2006.01) | |
| H04L 29/08 | (2006.01) | |
| H04L 12/859 | (2013.01) | |
| G06F 9/48 | (2006.01) | |
| G06F 3/06 | (2006.01) | |
| G06F 12/02 | (2006.01) | |

(Continued)

(52) U.S. Cl.
CPC .............. *H04L 67/34* (2013.01); *G06F 3/065* (2013.01); *G06F 3/067* (2013.01); *G06F 3/0619* (2013.01); *G06F 9/4881* (2013.01); *G06F 12/023* (2013.01); *G06F 16/1727* (2019.01); *G06Q 30/0224* (2013.01); *G06Q 30/0255* (2013.01); *H04L 47/2475* (2013.01); *H04L 67/06* (2013.01); *G06F 2212/1044* (2013.01)

(58) Field of Classification Search
CPC .......... G06Q 30/0224; G06Q 30/0222; G06Q 30/0251; G06Q 30/0255
See application file for complete search history.

(56) References Cited

U.S. PATENT DOCUMENTS

| 6,871,218 B2 | 3/2005 | Desai et al. |
| 2003/0088580 A1* | 5/2003 | Desai ................ G06F 17/30902 |

(Continued)

FOREIGN PATENT DOCUMENTS

EP    2923480 B1    11/2013

OTHER PUBLICATIONS

Anonymous "Prioritize Delivery of Content and Services Based on the Attentiveness of the Consumer", ip.com Disclosure No. IPCOM000236522D; publication date: May 1, 2014; 2 pgs.

*Primary Examiner* — Baboucarr Faal
(74) *Attorney, Agent, or Firm* — Cantor Colburn LLP; Noah Sharkan (57) ABSTRACT

A data processing system includes a processor and a local storage device connected to the processor. The data processing system is operated to identify one or more downloads for downloading to the local storage device. The system determines the amount of available space within the local storage device, selects a download from the identified download(s) that is smaller than the amount of available space within the local storage device, and downloads the selected download to the data processing system. The selected download is then stored in the local storage device, whilst not marking the space occupied by the selected download as being used.

13 Claims, 4 Drawing Sheets

(51) Int. Cl.
*G06F 16/17* (2019.01)
*G06Q 30/02* (2012.01)

(56) References Cited

U.S. PATENT DOCUMENTS

| | | |
|---|---|---|
| 2006/0031784 A1* | 2/2006 | Makela ................. G06F 3/0481 |
| | | 715/850 |
| 2009/0106381 A1 | 4/2009 | Kasriel et al. |
| 2011/0302224 A1* | 12/2011 | Yairi ..................... G06F 3/0605 |
| | | 707/824 |
| 2012/0278434 A1 | 11/2012 | Ziv et al. |
| 2014/0067686 A1* | 3/2014 | Tuttle .................... G06Q 30/06 |
| | | 705/51 |
| 2015/0208205 A1 | 7/2015 | Chan et al. |
| 2016/0110064 A1* | 4/2016 | Shapira .................. H04L 67/10 |
| | | 705/14.27 |
| 2019/0164069 A1* | 5/2019 | Zhivotvorev ............ G06N 5/04 |
| 2019/0260820 A1 | 8/2019 | Hess et al. |

* cited by examiner

DATA PROCESSING SYSTEM USING PRE-EMPTIVE DOWNLOADING

BACKGROUND

The present invention relates to a method of operating a data processing system, to the data processing system itself and to a computer program product for operating a processor of the data processing system.

SUMMARY

According to a first aspect of the present invention, there is provided a method of operating a data processing system including a processor and a local storage device connected to the processor, the method comprising identifying one or more downloads for downloading to the local storage device, determining the amount of available space within the local storage device, selecting a download from the identified download(s) that is smaller than the amount of available space within the local storage device, downloading the selected download to the data processing system, and storing the selected download in the local storage device, whilst not marking the space occupied by the selected download as being used.

According to a second aspect of the present invention, there is provided a data processing system including a processor and a local storage device connected to the processor, the processor arranged to identify one or more downloads for downloading to the local storage device, determine the amount of available space within the local storage device, select a download from the identified download(s) that is smaller than the amount of available space within the local storage device, download the selected download to the data processing system, and store the selected download in the local storage device, whilst not marking the space occupied by the selected download as being used.

According to a third aspect of the present invention, there is provided a computer program product for controlling a data storage system including a processor and a local storage device connected to the processor, the computer program product comprising a computer readable storage medium having program instructions embodied therewith, the program instructions executable by the processor to cause the processor to identify one or more downloads for downloading to the local storage device, determine the amount of available space within the local storage device, select a download from the identified download(s) that is smaller than the amount of available space within the local storage device, download the selected download to the data processing system, and store the selected download in the local storage device, whilst not marking the space occupied by the selected download as being used.

BRIEF DESCRIPTION OF THE DRAWINGS

Preferred embodiments of the present invention will now be described, by way of example only, with reference to the following drawings, in which:—

DETAILED DESCRIPTION

Figure 1:
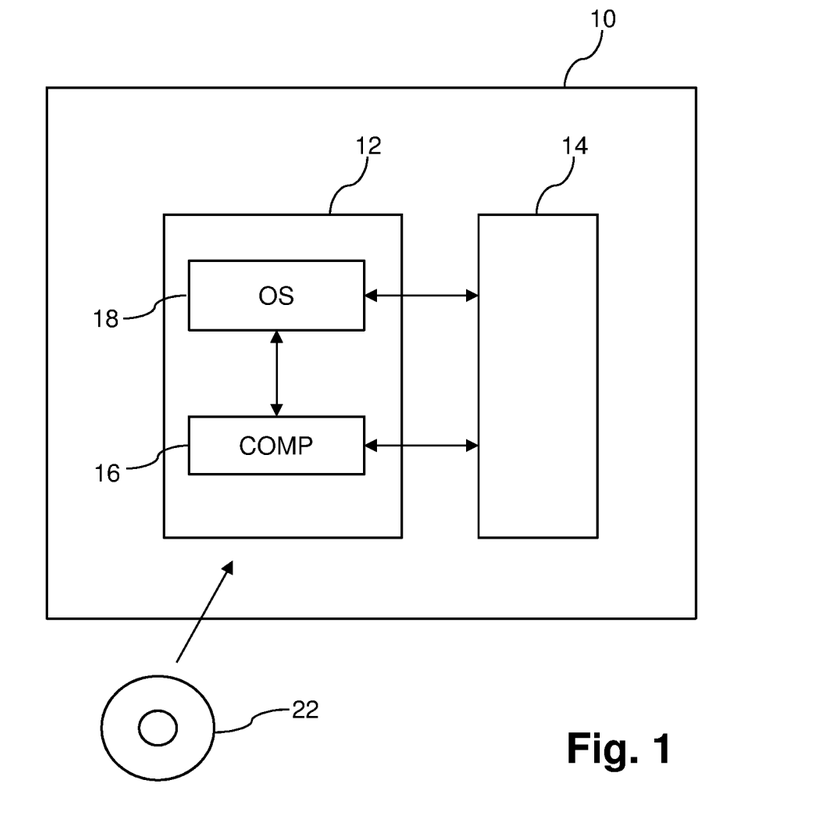
FIG. 1 is a schematic diagram of a data processing system.

FIG. 1 shows a data processing system 10, which includes a processor 12 and a local storage device 14 (such as a hard drive), which is connected to the processor 12. The data processing system 10 could be a standard desktop computer that is connected to wide area network such as the Internet or could be a games console likewise connected to the Internet. The data processing system 10 is able to download software, computer programs and digital media such as video and audio files (generically referred to as downloads) from the Internet. The data processing system 10 is configured to perform a certain amount of downloading pre-emptively, without any interaction from a user of the system 10. A computer readable storage medium 22 is provided, which is a CD-ROM 22 storing a computer program product that can be used to control the processor 12 to operate the data processing system 10. The processor 12 executes instructions from the computer program product to operate the processor 12.

In general, when a user downloads a large piece of software that they have purchased, there is an inevitable wait for the software to download, along with any patches and fixes that are needed. As a result of this, a user must wait longer than might be acceptable in order to use the software that they have purchased. In the case of Steam, and pre-ordering computer games, a user is sometimes allowed to download the software before the publication date. However, the user must have pre-ordered the game in order to do this, and no time is saved if the user purchases the game after publication. In another case a game could be physically purchased, however since the publication date several updates to the core game software have become available. Before the user can play the purchased game, all the updates must be downloaded and applied to the software. Since the updates can be large there will be a wait for the software to download.

A component 16 uses predictive analysis, which is already in place in many software and digital media product marketplaces to tailor the advertising of available software, to predict the software/digital media a user is most likely to purchase and download within a limited timeframe. If available, the component 16 also analyses the software that friends of the user have recently bought, in order to identify products that the user is likely to purchase. For example, with computer games, if a large number of a user's friends have recently purchased a networked/online multiplayer game, it is likely that the user will also purchase the game in order to play with their friends. Or if the user has purchased and played three titles in a game series, they are more likely to purchase the fourth when it is released.

Once the prediction of the most likely purchases has been made, the component 16 then pre-downloads the software onto the user's system 10, along with any patches and fixes, such that once the purchase is made, no large downloads are required before using the software. However in current state of the art systems, these downloads will reduce the amount of space available to the user on the local storage device 14. With the use of the component 16 these downloads do not use up any visible disk space on the user's hard drive 14, as the disk space is not marked by the operating system 18 as being used, and can thus be overwritten if necessary. The operation of the component 16 is better than existing solutions as the downloads do not take up disk space, and the component 16 can download software before it is purchased, cutting out the biggest part of the download cost after purchase and saving the user time.

Within the data processing system 10 is the software component 16 that is run by the processor 12, which interacts with the local storage device 14 outside of the normal operating system 18 interaction with the local storage device 14. This component 16 is able to store downloads on the local storage device 14 without marking the space in the local storage device 14 as being used. This means that data is stored within the local storage device 14 by the component 16, without the normal memory management functions within the operating system 18 being aware that space is being used. The component 16 is able to store downloads in the local storage device 14 and these downloads do not use any visible disk space.

The component 16 decides what downloads to access and download according to one or more defined algorithms that anticipate the user's behaviour. For example, a user profile may be present which contains information about the user's preferences, or information about the user's previous downloads or information about other user's downloads may be present, all of which can be used to select a download, without the user being aware that such a selection has been made. For example, a user may have purchased a specific computer game in the past. When a new title is available in the same series as that previously purchased by the user, then this new title can be downloaded by the component 16 and stored in the local storage device 14.

Once the predictive analysis operated by the component 16 has homed in on the most likely candidate of software/digital media to download, the component 16 locates an available section of the hard disk 14, preferably at the end of hard disk partition. If a large enough section of hard disk 14 cannot be located, no further action is taken. If adequate disk space is available, the component 16 begins writing the data to the identified section of the hard disk 14, without notifying the operating system 18 of the write action. This allows the operating system 18 to use this space as necessary, and allocate the space as normal under all current known hard drive formats.

The component 16 keeps a record of where the software/media data is located. This is achieved by splitting the download into chunks of data and recording both the offset of the chunk on the storage medium 14, its length and a checksum value and this allows the component 16 to later read back the chunk of data and check the checksum matches to ascertain if the chunk has been completely or partially overwritten. If a section of the stored data is overwritten, the component 16 searches for further available disk space. If the space is available, the overwritten section is downloaded again. If the space is not available, no further action is taken. In this way, the component 16 detects when at least a portion of the selected download stored in the local storage device 14 has been overwritten and determines that an amount of available space within the local storage device 14 greater than the overwritten portion of the selected download is present. The component 16 continually monitors the storage device 14 to see whether the downloads have been overwritten at all.

If space is available, after an overwrite, then the component 16 downloads the overwritten portion of the selected download to the data processing system 10, and stores the overwritten portion of the selected download in the local storage device 14, again whilst not marking the space occupied by the overwritten portion of the selected download as being used. This enables the component 16 to continually monitor the local storage device 14, so that should the operating system 18 overwrite any part of the stored download, the component 16 can re-download the overwritten portion and store that again in the local storage device 14. This keeps the entirety of the download stored in the storage device 14, while allowing the memory management within the operating system 18 to continue to operate as normal.

Should the user ultimately purchase the software/media that has been downloaded, the component 16 checks whether the complete download is still on the disk 14, or if some has been overwritten and no disk space is left. If there is not enough space, the user is informed that the download cannot be completed. The user must then take action to free up enough space to complete the download. If the complete download is on disk, the component 16 notifies the operating system 18 that the section of disk space has been written to, and the software/media is then installed in the usual way. This therefore, to the user, gives the effect that the download has become instantly available.

Figure 2:
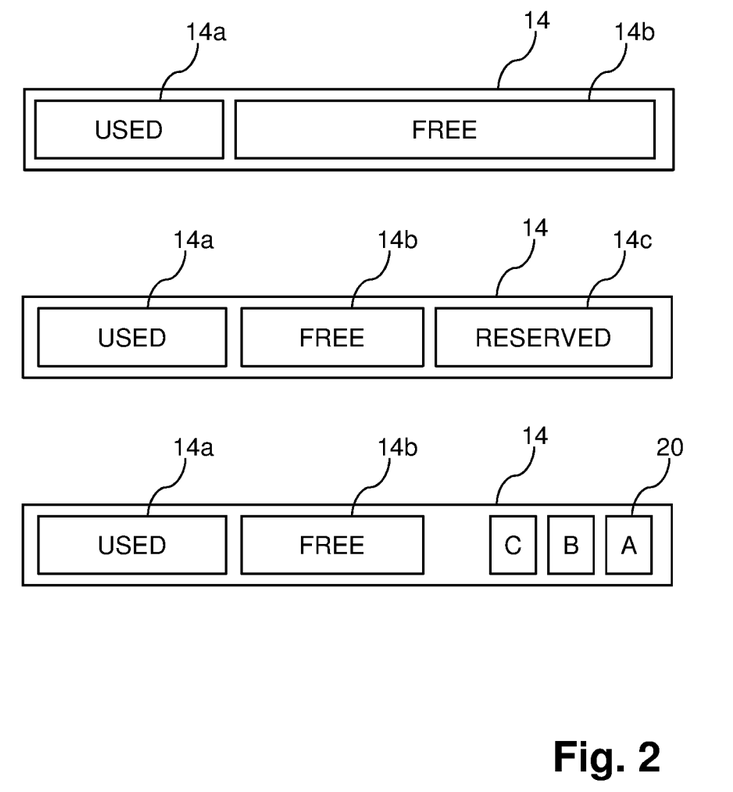
FIG. 2 is a schematic diagram of a local storage device of the data processing system.

FIG. 2 shows more detail of the operation of the component 16 in relation to the interaction with the local storage device 14 (the hard disk of the data processing system 10). Three different views of the storage device 14 are shown in the Figure. In the top view, the storage device 14 is shown in a condition prior to any interaction with the component 18. Here the storage space within the device 14 is split between used storage 14a and free space 14b. The used storage 14a is that which has already been written to by the operating system 18 (and indeed includes a copy of the operating system 18). The storage 14a also contains the program code and stores data for the component 16.

The component 16 is arranged to determine the amount of available space within the local storage device 14. This comprises determining the total amount of free space 14b within the local storage device 14 and setting the available space 14c within the local storage device 14 as a predefined percentage (for example 50%) of the total free space 14b within the local storage device 14. This arrangement is shown in the middle view of FIG. 2, which shows that the component 16 has reserved available space 14c at the opposite end of the storage device 14 to that being written to by the operating system 18. The available space 14c at this point has nothing written to it by the component 16. This arrangement is a logical change only known by the component 16, the operating system 18 is unaware that this subsection 14c will be used by the component 16.

The available space 14c can now be used to store one or more downloads 20 by the component. The component 16 can download multiple downloads 20 if space allows. The component 16 selects one or more further download(s) from the identified downloads that is/are in total smaller than the amount of still available space within the local storage device 14 and downloads the selected further download(s) 20 to the data processing system 10. The component 16 stores the selected further download(s) in the local storage device 14, whilst not marking the space occupied by the selected further download(s) 20 as being used.

Figure 3:
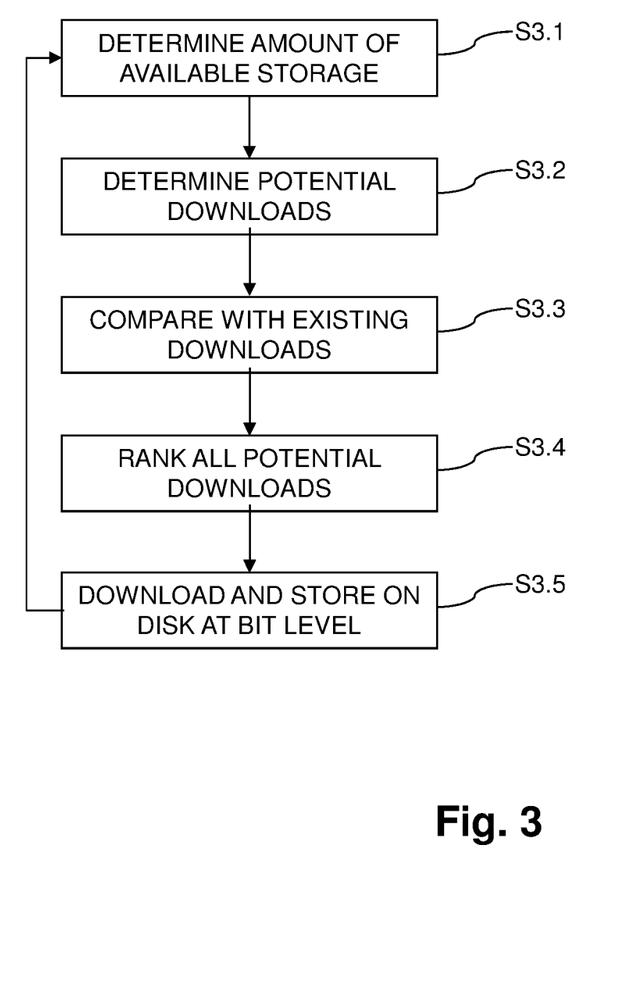
FIG. 3 is a flowchart of a preferred method of operating the data processing system.

FIG. 3 shows a preferred method of operating the data processing system 10, in terms of identifying a download 20 and downloading the download 20 and storing that download 20 in the local storage device 14. Step S3.1 comprises determining the amount of free storage (not used by the operating system 18) in the storage device 14 and calculating the desired percentage to designate as the available space. Step S3.2 comprises determining potential downloads, by connecting to external sources of downloads 20, such as Steam (for computer games) and streaming services (such as Netflix and Amazon) and obtaining details of potential downloads that the user can access from these sources.

The next step of the method is step S3.3, which comprises comparing potential downloads with any existing downloads that are already stored within the local storage device 14 and discarding any that are already downloaded and stored within the local storage device 14. At step S3.4, the component 16 ranks all potential downloads in order of the likelihood of the download being used. As discussed above, this can be based on a user's profile or the user previous download habits or the download habits of the user's connected friends. The ranking applies weights to the different candidate downloads based upon the different criteria being used. For example, the most weight can be applied to downloads that are sequels to titles already played or viewed by the user.

The final step in the process is step S3.5, which comprises downloading and writing the top ranked download(s) to the storage device 14, which is performed at a bit level and bypassing all of the normal operating system memory management operations. The space within the storage device 14 that is occupied by the download(s) 20 is not marked as being used, from the point of view of the operating system 18. The process of downloading and storing downloads 20 in the local storage device 14 continues until the available space within the storage device 14 is completely used up. Depending upon the size of the free space available and the percentage that has been used for each of the downloads 20, multiple downloads 20 will be stored in the storage device 14.

Figure 4:
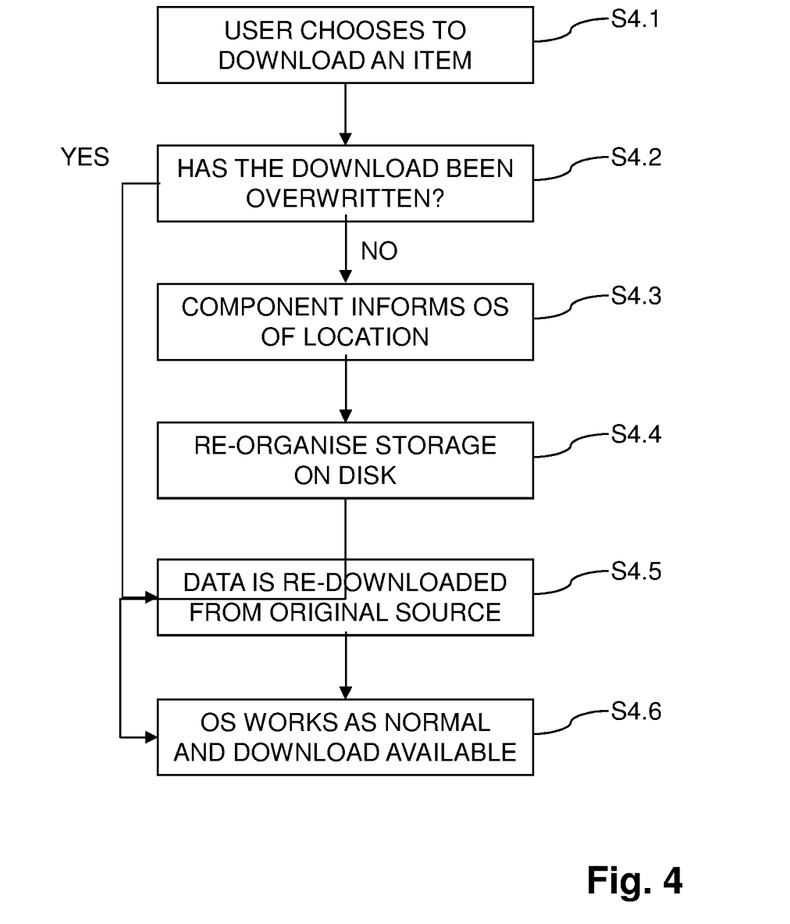
FIG. 4 is a further flowchart of a method of operating the data processing system.

FIG. 4 shows a flowchart that details the process that occurs when the user of the data processing system 10, at a later time, chooses to download something that has already been downloaded by the component 16. At step S4.1, the user chooses to download something (such as a computer game or film) that has already been downloaded by the component 16. At step S4.2, a check is made to see if any or all of the chosen download 20 has been overwritten by the operating system 18, this check can be accomplished using a hashing algorithm. If the answer to this question is no, then the process moves to step S4.3, but if the answer is yes, then the process moves to step S4.5.

At step S4.3, the component 16 informs the operating system 18 of the location of the download 20, by filling in the operating systems file system table of contents with the relevant location information. The process continues with step S4.4, where the storage used on the disk 14 is reorganised to move and/or fill unused space as appropriate.

Within the component 16 there is a map of the storage that the component 16 is writing data to, however a portion of this storage has now been handed over to the operating system 18 as a file that the user can now use. At this point, the percentage of the storage that component 16 was going to use has changed. The component 16 may need to adjust the amount of storage that it is using and the component 16 may also need to physically move chunks of downloaded data around on the disk 14 to move them closer to the end of the partition. As mentioned above, if any of the content of the download 20 has been overwritten, then the process moves to step S4.5, where the necessary data is re-downloaded from the original source and made available to the operating system 18. Both branches of the process terminate with step S4.6, where the operating system 18 behaves as normal for file allocation and the files of the download become available to the end user.

In this way, the user is able to access a potentially large and time consuming download 20, without having to actually wait for the download 20 to be transmitted and received (which can take a significant amount of time for large files). The process is invisible to the user and to the system's operating system 18. The component 16 is pre-emptively downloading one or more large downloads 20, in order that the user does not have to wait for that download 20 at the time at which the wish to access the download 20. The user simply accesses a suitable connected site to access something such as a new computer game and will find that the game is already downloaded onto the user's local storage device.

The component 16 can also perform a re-prioritisation exercise whereupon the component 16 re-examines the downloaded files 20 to determine whether the priority order that the data is in is an accurate reflection of a more current priority order. The order can then be adjusted, as needed this will re-order the files as they appear on the disk 14. This reprioritisation can be performed from the component's point of view, a hard drive becomes full, or at regular configurable intervals, and/or on attempting to download a new file.

The component 16 can also be configured to identify a higher priority download for downloading to the local storage device 14 than a selected download that is already stored in the local storage device 14. The component 16 will then download the higher priority download to the data processing system 10, and store the higher priority download in the local storage device 14, whilst again not marking the space occupied by the higher priority download as being used. Here the rebalancing applied by the component 16 will result in a more relevant download being identified and downloaded to the storage device 14, either overwriting an existing download or creating a new download in the storage device 14.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of operating a data processing system including a processor and a local storage device connected to the processor, the method comprising: identifying one or more downloads for downloading to the local storage device, determining an amount of available space within the local storage device, selecting a download from the identified downloads that is smaller than the amount of available space within the local storage device, downloading the selected download to the data processing system, and storing the selected download in the local storage device, whilst not marking space occupied by the selected download as being used, wherein the one or more downloads are identified by predicting content items that a user of the data processing system is likely to download wherein predicting content items that the user of the data processing system is likely to download is based at least in part on an analysis of content items recently bought by friends of the user.

2. A method according to claim 1, and further comprising detecting that at least a portion of the selected download stored in the local storage device has been overwritten, determining that an amount of available space within the local storage device greater than an overwritten portion of the selected download is present, downloading the overwritten portion of the selected download to the data processing system, and storing the overwritten portion of the selected download in the local storage device, whilst not marking the space occupied by the overwritten portion of the selected download as being used.

3. A method according to claim 1, wherein the determining of the amount of available space within the local storage device comprises determining a total amount of free space within the local storage device and setting the available space within the local storage device as a predefined percentage of the total free space within the local storage device.

4. A method according to claim 1, and further comprising selecting one or more further download(s) from the identified downloads that is/are in total smaller than an amount of still available space within the local storage device, downloading the selected further download(s) to the data processing system, and storing the selected further download(s) in the local storage device, whilst not marking the space occupied by the selected further download(s) as being used.

5. A method according to claim 1, and further comprising identifying a higher priority download for downloading to the local storage device than a selected download stored in the local storage device, downloading the higher priority download to the data processing system, and storing the higher priority download in the local storage device, whilst not marking the space occupied by the higher priority download as being used.

6. A data processing system including a processor and a local storage device connected to the processor, the processor arranged to: identify one or more downloads for downloading to the local storage device, determine an amount of available space within the local storage device, select a download from the identified download(s) that is smaller than the amount of available space within the local storage device, download the selected download to the data processing system, store the selected download in the local storage device, whilst not marking space occupied by the selected download as being used; identifying a higher priority download for downloading to the local storage device than a selected download stored in the local storage device; downloading the higher priority download to the data processing system; and overwriting the selected download stored with the higher priority download in the local storage device, whilst not marking the space occupied by the higher priority download as being used, wherein the one or more downloads are identified by predicting content items that a user of the data processing system is likely to download wherein predicting content items that the user of the data processing system is likely to download is based at least in part on an analysis of content items recently bought by friends of the user.

7. A system according to claim 6, wherein the processor is further arranged to detect that at least a portion of the selected download stored in the local storage device has been overwritten, determine that an amount of available space within the local storage device greater than an overwritten portion of the selected download is present, download the overwritten portion of the selected download to the data processing system, and store the overwritten portion of the selected download in the local storage device, whilst not marking the space occupied by the overwritten portion of the selected download as being used.

8. A system according to claim 6, wherein the processor is arranged, when determining the amount of available space within the local storage device, to determine a total amount of free space within the local storage device and setting the available space within the local storage device as a predefined percentage of the total free space within the local storage device.

9. A system according to claim 6, wherein the processor is further arranged to select one or more further download(s) from the identified downloads that is/are in total smaller than an amount of still available space within the local storage device, download the selected further download(s) to the data processing system, and store the selected further download(s) in the local storage device, whilst not marking the space occupied by the selected further download(s) as being used.

10. A computer program product for controlling a data storage system including a processor and a local storage device connected to the processor, the computer program product comprising a computer readable storage medium having program instructions embodied therewith, the program instructions executable by the processor to cause the processor to: identify one or more downloads for downloading to the local storage device, determine an amount of available space within the local storage device, select a download from the identified download(s) that is smaller than the amount of available space within the local storage device, download the selected download to the data processing system, store the selected download in the local storage device, whilst not marking space occupied by the selected download as being used; identify a higher priority download for downloading to the local storage device than a selected download stored in the local storage device; download the higher priority download to the data processing system; and overwrite the selected download stored with the higher priority download in the local storage device, whilst not marking the space occupied by the higher priority download as being used, wherein the one or more downloads are identified by predicting content items that a user of the data processing system is likely to download wherein predicting content items that the user of the data processing system is likely to download is based at least in part on an analysis of content items recently bought by friends of the user.

11. A computer program product according to claim 10, and further comprising instructions for detecting that at least a portion of the selected download stored in the local storage device has been overwritten, determining that an amount of available space within the local storage device greater than an overwritten portion of the selected download is present, downloading the overwritten portion of the selected download to the data processing system, and storing the overwritten portion of the selected download in the local storage device, whilst not marking the space occupied by the overwritten portion of the selected download as being used.

12. A computer program product according to claim 10, wherein the instructions for determining the amount of available space within the local storage device comprise instructions for determining a total amount of free space within the local storage device and setting the available space within the local storage device as a predefined percentage of the total free space within the local storage device.

13. A computer program product according to claim 10, and further comprising instructions for selecting one or more further download(s) from the identified downloads that is/are in total smaller than an amount of still available space within the local storage device, downloading the selected further download(s) to the data processing system, and storing the selected further download(s) in the local storage device, whilst not marking the space occupied by the selected further download(s) as being used.

* * * * *